United States Patent
Chan et al.

(10) Patent No.: US 10,415,985 B1
(45) Date of Patent: *Sep. 17, 2019

(54) TECHNOLOGY FOR GENERATING ALTERNATE NAVIGATION DIRECTIONS FOR VEHICLES

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,157

(22) Filed: Dec. 10, 2018

Related U.S. Application Data

(63) Continuation of application No. 15/872,282, filed on Jan. 16, 2018, now Pat. No. 10,151,594.

(60) Provisional application No. 62/448,181, filed on Jan. 19, 2017.

(51) Int. Cl.
*B60W 40/09* (2012.01)
*G01C 21/34* (2006.01)
*G06K 9/00* (2006.01)
*B60W 40/08* (2012.01)

(52) U.S. Cl.
CPC ......... *G01C 21/3461* (2013.01); *B60W 40/09* (2013.01); *G01C 21/3415* (2013.01); *G01C 21/3492* (2013.01); *G06K 9/00845* (2013.01); *B60W 2040/0872* (2013.01)

(58) Field of Classification Search
None
See application file for complete search history.

(56) References Cited

U.S. PATENT DOCUMENTS

| 2013/0121591 A1 | 5/2013 | Hill |
| 2016/0185354 A1* | 6/2016 | Lisseman ............... B62D 1/046 701/36 |
| 2017/0030726 A1 | 2/2017 | French et al. |
| 2018/0143635 A1 | 5/2018 | Zijderveld et al. |
| 2018/0157923 A1 | 6/2018 | el Kaliouby, Jr. et al. |

(Continued)

*Primary Examiner* — Richard M Camby
(74) *Attorney, Agent, or Firm* — Marshall, Gerstein & Borun LLP; Randall G. Rueth

(57) ABSTRACT

Systems and methods for generating alternate navigation directions for vehicles are provided. According to certain aspects, image sensor data of a vehicle operator may be used to determine the emotional state of vehicle operators in a plurality of vehicles in proximity to each other. The plurality of vehicles in proximity to each other may be considered to be a group of vehicles. If it is determined that more than one vehicle operator in the group of vehicles is frustrated, the electronic device of a vehicle operator of an approaching vehicle may notify the vehicle operator that there is a nearby group of vehicles with frustrated vehicle operators. The electronic device of the vehicle operator of the vehicle approaching the group of vehicles with frustrated vehicle operators may generate and provide alternate navigation directions to the vehicle operator in order to avoid the group of vehicles with frustrated vehicle operators.

20 Claims, 7 Drawing Sheets

(56) References Cited

U.S. PATENT DOCUMENTS

2018/0196432 A1 7/2018 Krupat et al.
2018/0197153 A1 7/2018 Busch et al.

\* cited by examiner

US 10,415,985 B1

TECHNOLOGY FOR GENERATING ALTERNATE NAVIGATION DIRECTIONS FOR VEHICLES

CROSS-REFERENCE TO RELATED APPLICATIONS

This application is a continuation of U.S. patent application Ser. No. 15/872,282, filed Jan. 16, 2018, which claims the benefit of the filing date of U.S. Provisional Patent Application No. 62/448,181, filed Jan. 19, 2017 and titled "TECHNOLOGY FOR GENERATING ALTERNATE NAVIGATION DIRECTIONS FOR VEHICLES." The disclosures of these applications are hereby incorporated by reference in their entireties.

FIELD

The present disclosure is directed to generating alternate navigation directions for vehicles. More particularly, the present disclosure is directed to systems and methods for redirecting a vehicle due to the estimated emotional state of operators of a group of vehicles that the vehicle is approaching.

BACKGROUND

Generally, vehicle operators may experience certain emotions while operating vehicles. In particular, certain driving conditions or hazards (e.g., road congestion, construction, bad weather, etc.) can cause vehicle operators to become frustrated or similar emotions. Frustration may negatively impact the decision making of vehicle operators, which may put the vehicle operator, additional vehicle occupants, and the occupants of other vehicles in close proximity at risk of an accident, injury, or death.

In some situations, a group or cluster of vehicle operators may collectively be frustrated as a result of a specific condition. For example, a group of vehicle operators may be traveling behind one or two other vehicles which are traveling under a posted speed limit, where any vehicles traveling behind or approaching the frustrated cluster may find themselves frustrated if they reach the frustrated cluster. Accordingly, there is an opportunity for systems and methods that automatically detect when vehicles may be approaching clusters of frustrated vehicle operators, and automatically facilitate functionalities to direct the vehicles away from the frustrated clusters.

SUMMARY

In one aspect, a computer-implemented method in an electronic device for dynamically modifying a route is provided. The method may include receiving, from a first electronic device associated with a first vehicle located at a first location, a first set of image data depicting a first operator of the first vehicle; receiving, from a second electronic device associated with a second vehicle located at a second location, a second set of image data depicting a second operator of the second vehicle, the second location within a threshold distance from the first location; analyzing, by a computer processor, the first set of image data and the second set of image data; determining, based on the analyzing, that each of the first operator and the second operator is frustrated; identifying a third vehicle located at a third location behind the first location and the second location; generating, based on the third location, an alternate route to avoid the first location and the second location; and transmitting, via a network connection, the alternate route to a third electronic device associated with the third vehicle.

In another aspect, a system in an electronic device for dynamically modifying a route is provided. The system may include a memory configured to store non-transitory computer executable instructions, and a processor configured to interface with the memory. The processor may be configured to execute the non-transitory computer executable instructions to cause the processor to receive, from a first electronic device associated with a first vehicle located at a first location, a first set of image data depicting a first operator of the first vehicle; receive, from a second electronic device associated with a second vehicle located at a second location, a second set of image data depicting a second operator of the second vehicle, the second location within a threshold distance from the first location; analyze, by a computer processor, the first set of image data and the second set of image data; determine, based on the analyzing, that each of the first operator and the second operator is frustrated; identify a third vehicle located at a third location behind the first location and the second location; generate, based on the third location, an alternate route to avoid the first location and the second location; and transmit, via a network connection, the alternate route to a third electronic device associated with the third vehicle.

DETAILED DESCRIPTION

Figure 1A:
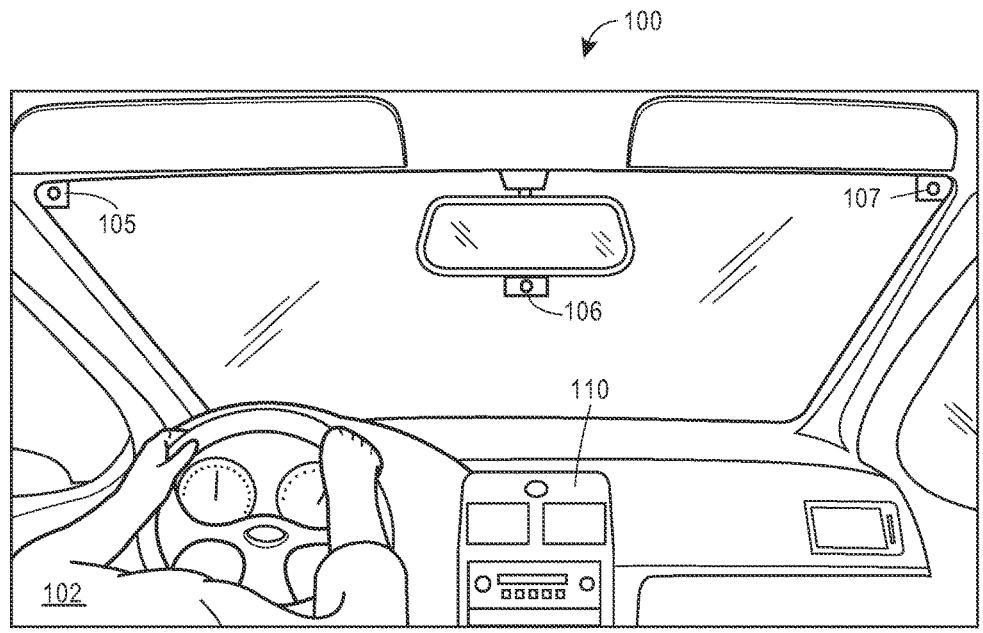
FIGS. 1A and 1B depict exemplary environments within a vehicle including various components configured to facilitate various functionalities, in accordance with some embodiments.

The present embodiments may relate to, inter alia, generating alternate navigation directions (herein, the term "navigation directions" will be used interchangeably with "route") for a vehicle operator in a vehicle to avoid a group of frustrated vehicle operators. Generally, certain driving conditions such as road congestion, construction, bad weather, or the like, may cause some vehicle operators to become frustrated. Being frustrated may negatively impact an individual's decision making, resulting in increased vehicular risk to the individual and/or to other individuals. The systems and methods disclosed herein leverage various sensors to identify a group of frustrated vehicle operators and an additional vehicle operator who may be approaching the group of frustrated vehicle operators. The systems and methods may further generate alternate navigation directions for the additional vehicle operator to avoid the group of frustrated vehicle operators, where an electronic device may display the alternate navigation directions for review by the additional vehicle operator.

The systems and methods therefore offer numerous benefits. In particular, the facilitation of alternate navigation directions may result in fewer frustrated vehicle operators, and roadways may become safer. Additionally, the systems and methods may improve traffic conditions by diverting vehicle operators from highly congested roadways with frustrated vehicle operators. It should be appreciated that other benefits are envisioned.

The systems and methods discussed herein address a challenge that is particular to vehicular navigation. In particular, the challenge relates to a difficulty in effectively communicating relevant navigation information to vehicle operators. Conventionally, individuals operate vehicles without the knowledge of the emotional state of the other individuals operating vehicles around them. The systems and methods discussed herein identify groups of frustrated vehicle operators, identify additional vehicles that may be approaching the frustrated vehicle operators, and communicate notifications indicating the same to the additional vehicles. Additionally, the systems and methods generate and communicate alternate navigation directions for the additional vehicles to avoid the groups of frustrated vehicle operators. Further, because the systems and methods employ the collection, compiling, storing, and displaying of data associated with the vehicle and vehicle occupant, the systems and methods are necessarily rooted in computer technology in order to overcome the noted shortcomings that specifically arise in the realm of vehicular navigation.

Similarly, the systems and methods provide improvements in technical fields, namely, sensor data processing and generating navigation directions. Instead of systems and methods merely being performed by hardware components using basic functions, the systems and methods employ complex steps that go beyond the mere concept of simply retrieving and combining data using a computer. In particular, the hardware components capture sensor data, analyze the sensor data, determine relative location and movement of multiple vehicles, and generate and communicate navigation directions. This combination of elements further imposes meaningful limits in that the operations are applied to improving sensor data processing and generating navigation directions in a meaningful and effective way.

According to implementations, the systems and methods may support dynamic, real-time, or near real-time analysis of any captured, received, and/or detected data. In particular, the electronic device may receive data about a frustrated vehicle operator in real-time or near-real-time, and may generate alternate navigation directions in real-time and near-real-time. In this regard, the vehicle occupant is afforded the benefit of an accurate and meaningful set of navigation directions that are based on the real-time or near-real time conditions of additional vehicles.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the individual 102, including various biometric information, movements, and/or the like.

Figure 1B:
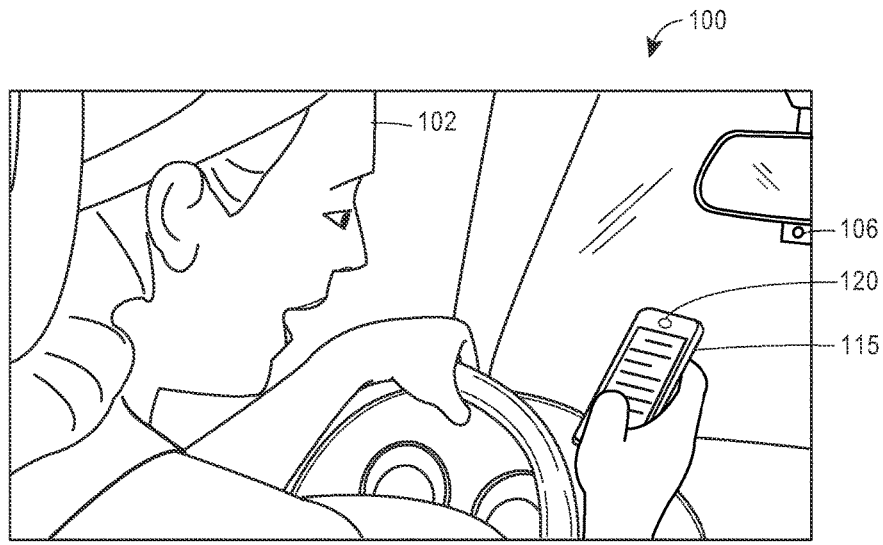

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, biometric, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data.

Figure 2:
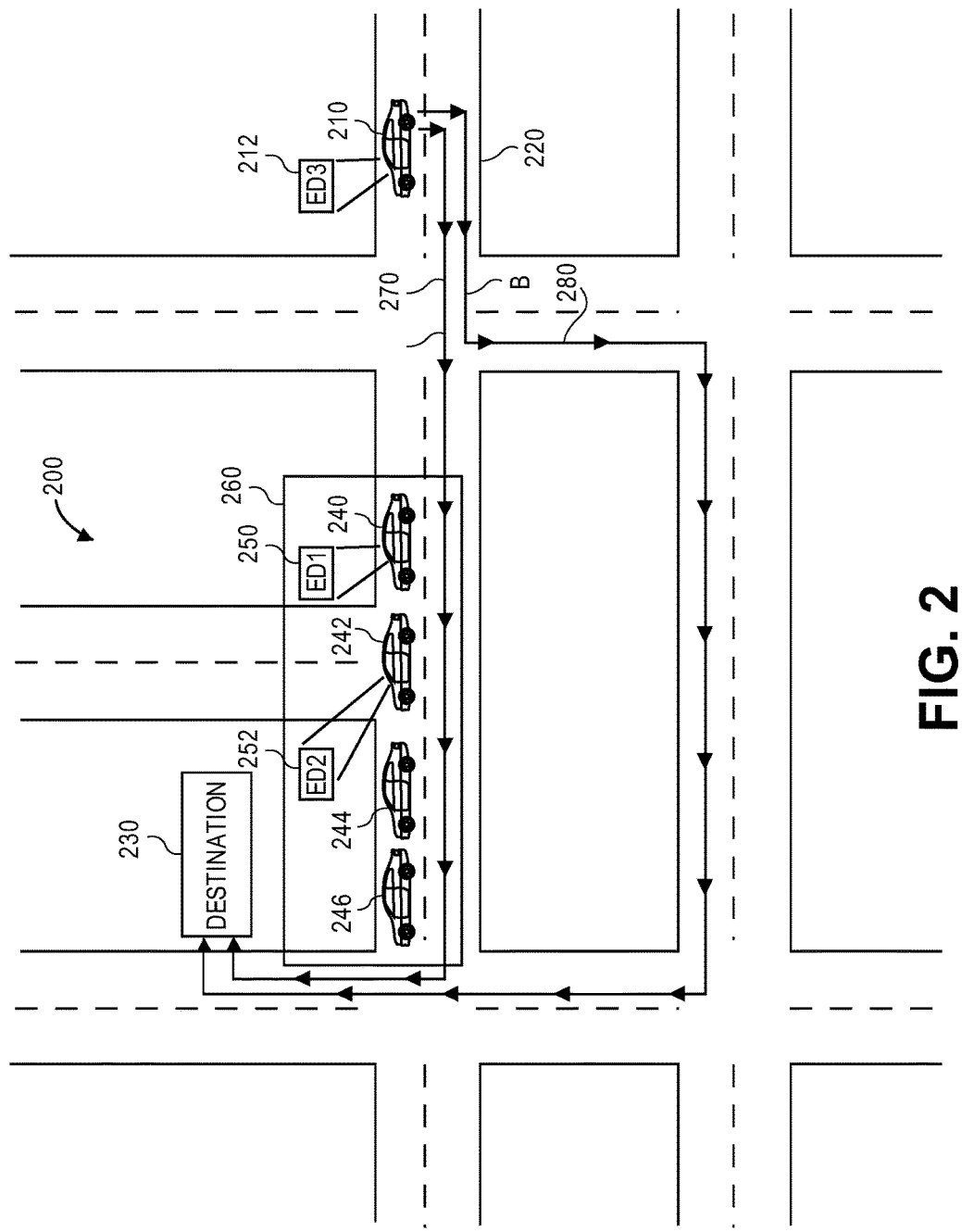
FIG. 2 depicts an exemplary scenario of a vehicle operating on a street in proximity to a group of other vehicles, in accordance with some embodiments.

FIG. 2 illustrates an exemplary scenario 200 depicting a set of vehicles in operation. In particular, the scenario 200 indicates a vehicle 210 having an associated electronic device (ED3) 212 that may be located within the vehicle 210, where the vehicle 210 may be operating on a street 220 and traveling towards a destination 230. According to the scenario, the vehicle 210 is traveling to the destination 230 using route A 270. On the same roadway and in front of the vehicle 210 relative to the direction of travel, there is a group 260 of vehicles 240, 242, 244, and 246. Vehicle 240 has an associated electronic device (ED1) 250 that may be located within the vehicle 240 and vehicle 242 has an associated electronic device (ED2) 252 that may be located within the vehicle 242. In other embodiments, there may be more or less vehicles in the group 260 of vehicles and any number, including all, of the vehicles in the group 260 of vehicles may have an associated electronic device. Additionally, according to embodiments, the electronic devices (ED1, ED2, and ED3) may be mobile devices (such as the electronic device 115 as discussed with respect to FIG. 1B).

The electronic devices (ED1 and ED2) 250 and 252 associated with vehicles 240 and 242 may analyze image data received from image sensors located within each vehicle (such as the image sensors 105, 106, and 107 as discussed with FIG. 1A) and determine that the operators of vehicles 240 and 242 are frustrated. The electronic device (ED3) 212 located within vehicle 210 may receive a notification that vehicle 210 is approaching a group 260 of vehicles 240, 242, 244, and 246 with frustrated vehicle operators and may generate alternate navigation directions (route B 280) for the vehicle operator of vehicle 210 to utilize in order to avoid the group 260 of vehicles 240, 242, 244, and 246. The vehicle operator of vehicle 210 may choose to utilize the alternate navigation directions generated by the electronic device (ED3) 212 and may change the route of travel for the vehicle 210 from route A 270 to route B 280 in order reach the destination 230 as well as avoid the group 260 of vehicles 240, 242, 244, and 246.

Figure 3:
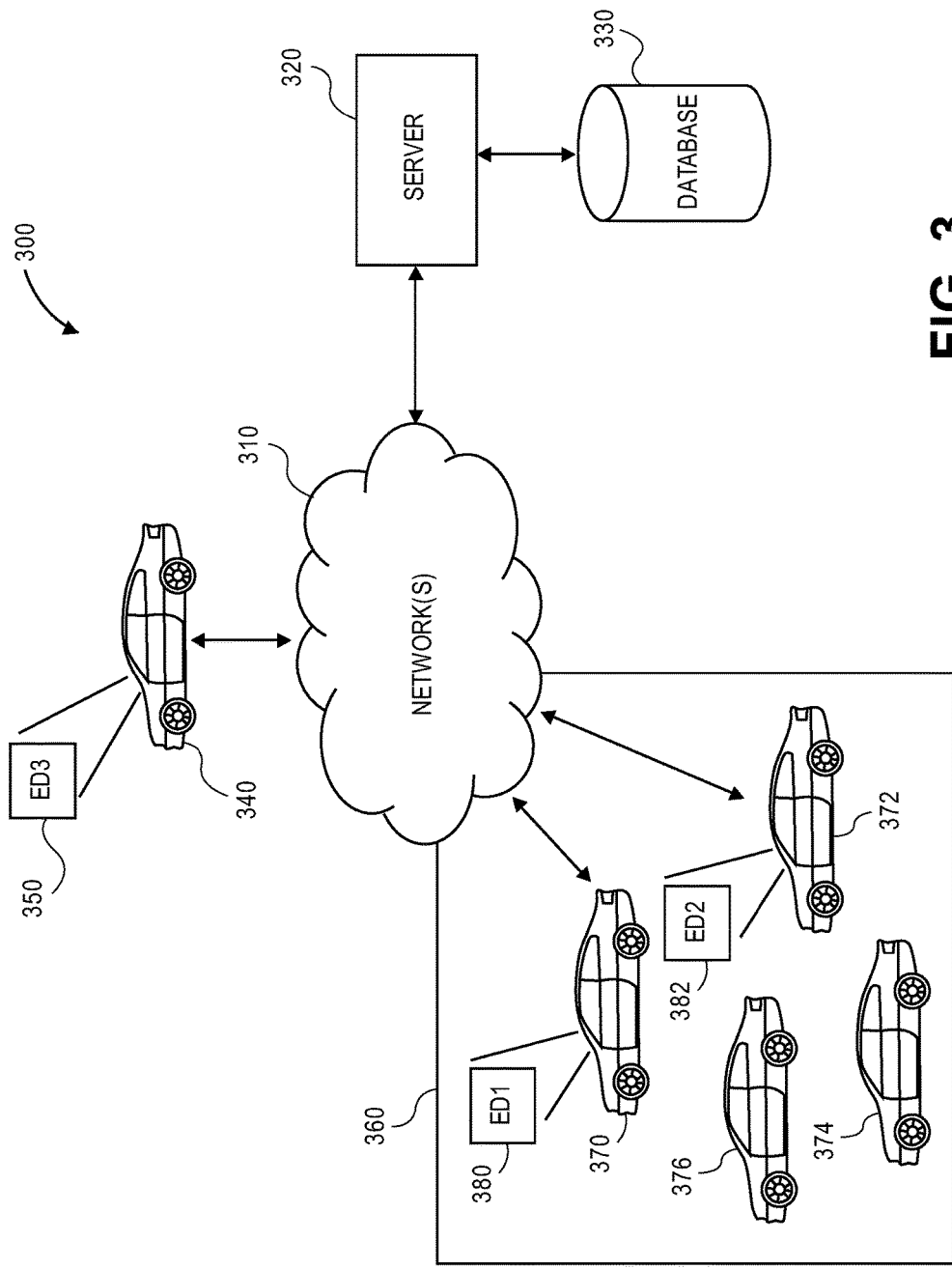
FIG. 3 depicts an exemplary block diagram of an interconnected wireless communication system connecting a group of vehicles and various components, in accordance with some embodiments.

FIG. 3 illustrates an exemplary block diagram of an interconnected wireless communication system 300. The system 300 may include a network(s) 310. In certain embodiments, the network(s) 310 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 310 may also be one or more private or local networks or dedicated frequency bands.

A remote server 320 may interface with a database 330 and communicate via the network(s) 310. The database 330 may contain or store various information and data. In one implementation, the database 330 may contain or store information about roadways to be used for navigation directions. The database 330 may also contain or store baseline images of vehicle operators to be used to determine the emotional state of the vehicle operators.

As depicted in FIG. 3, the communication system 300 may include various components configured to communicate via the network(s) 310. In particular, a vehicle 340 may be associated with an electronic device (ED3) 350 and the electronic device (ED3) 350 may communicate via the network(s) 310. Additionally, a group 360 of vehicles 370, 372, 374, and 376 may each be associated with an electronic device such as the electronic devices (ED1 380 and ED2 382), where the electronic devices 380, 382 may interface with the server 320 via the network(s) 310. According to embodiments, the individual electronic devices 350, 380, and 382 may be a mobile device (such as the electronic device 115 as discussed with respect to FIG. 1B). In other embodiments, the individual electronic devices 350, 380, and 382 may each be an on-board vehicle computer (such as the electronic device 110, as discussed with respect to FIG. 1A). Additionally, in embodiments, the individual electronic devices 350, 380, and 382 may communicate with each other and the server 320 via the network(s) 310. The functionalities of the components of the system 300 in illustrated in FIG. 3 are further described with respect to FIG. 4.

Figure 4:
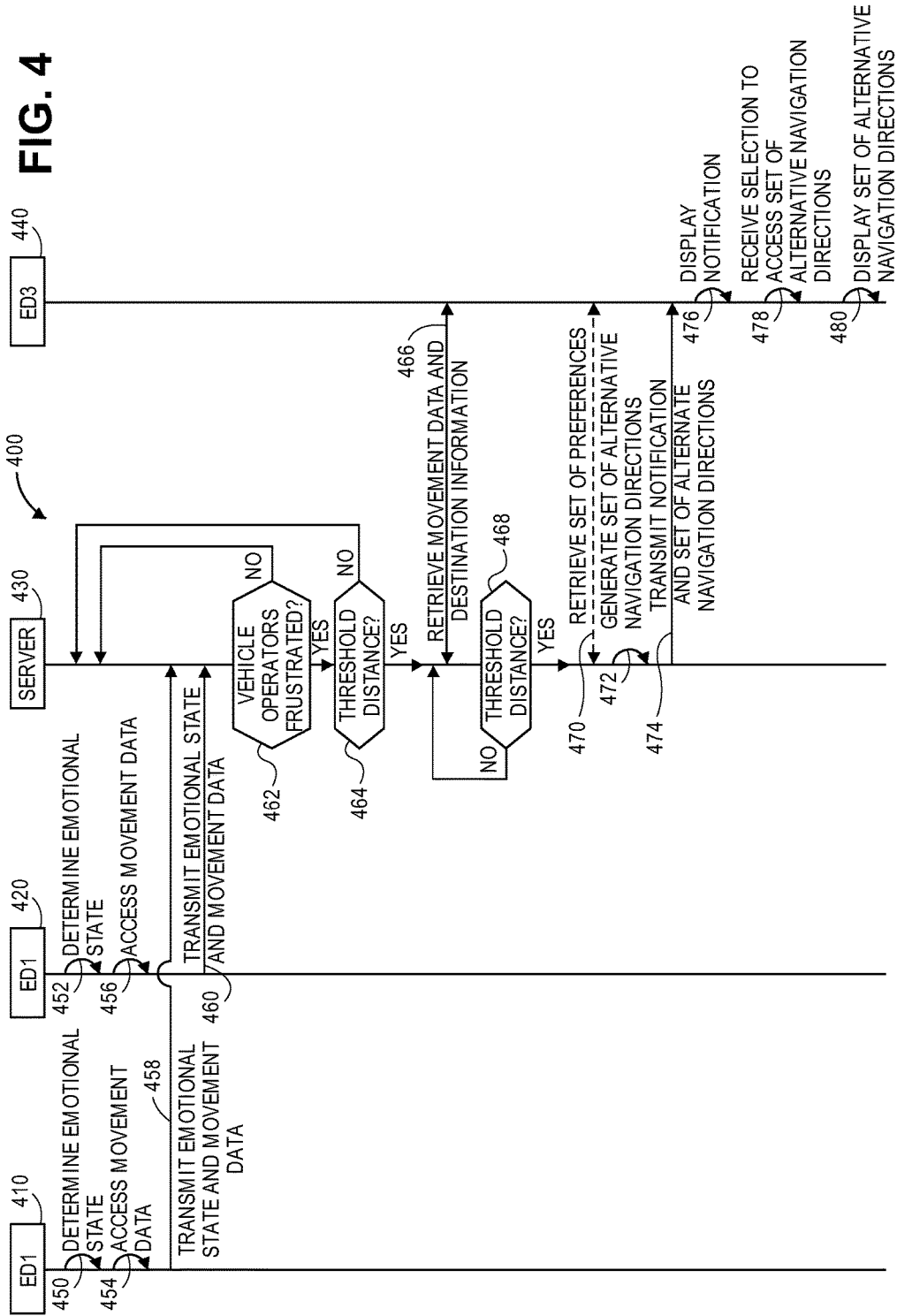
FIG. 4 depicts an exemplary signal diagram associated with generating alternate navigation directions for a vehicle, in accordance with some embodiments.

FIG. 4 depicts an exemplary signal diagram 400 associated with facilitating certain functionalities associated with the systems and methods. The signal diagram 400 includes a set of components that may be associated with generating alternate navigation directions: electronic devices (ED1, ED2, and ED3) 410, 420, and 440 (such as one of the electronic devices 110 and 115 as discussed with respect to FIGS. 1A and 1B) and a remote server 430 (such as the remote server 330 as discussed with respect to FIG. 3). According to embodiments, each of the electronic devices (ED1, ED2, and ED3) 410, 420, and 440 may be associated with a vehicle and may be present within the vehicle during operation of the vehicles by a respective operator.

The signal diagram 400 may begin with ED1 410 determining (450) an emotional state of a first operator of the first vehicle and ED2 420 determining (452) an emotional state of a second operator of the second vehicle, each of which may include multiple functionalities. In particular, ED1 410 may receive, capture, or otherwise access a first set of image data depicting a first operator of the first vehicle, and ED2 420 may receive, capture, or otherwise access a second set of image data depicting a second operator of the second vehicle. ED1 410 and ED2 420 may further analyze the first set of image data and the second set of image data, respectively. In order to analyze the image data, ED1 410 and ED2 420 may compare the first set of image data and the second set of image data, respectively, to a set of baseline image data indicating a set of emotions.

Based on the comparing, ED1 410 and ED2 420 may identify characteristics exhibited by the respective first operator and second operator and indicative of one or more emotions from the first set of image data and the second set of image data, respectively. Further, based on the characteristics indicative of the one or more emotions, ED1 410 may determine a percentage likelihood that the first vehicle operator is frustrated and ED2 420 may determine a percentage likelihood that the second vehicle operator is frustrated. For example, if the characteristics indicate that the first vehicle operator is screaming and gripping the steering wheel tightly with both hands, ED1 410 may determine that there is a 75% likelihood that the first vehicle operator is frustrated. As another example, if the characteristics indicate that the second vehicle operator is shaking his head from side-to-side and hitting the steering wheel with his fists, ED2 420 may determine that there is a 90% likelihood that the second vehicle operator is frustrated. In embodiments, ED1 410 and ED2 420 may determine the percentage likelihood that the first vehicle operator and the second vehicle operator, respectively, are experiencing other emotional states (e.g., happiness, sadness, anger, etc.) in addition to or instead of frustration. In embodiments, ED1 410 and ED2 420 may determine the respective emotional states, and perform the functionalities relating thereto, at concurrent or differing times.

In another embodiment, after receiving, capturing, or otherwise accessing the image data, ED1 410 and ED2 420 may transmit image data depicting the first vehicle operator and the second vehicle operator, respectively, to the remote server 420 via a network connection. The remote server 420 may process and analyze the image data of the first vehicle operator and the second vehicle operator to determine respective emotional states of the first vehicle operator and the second vehicle operator, similar to the analysis performed by ED1 410 and ED2 420, as described above. After the remote server 420 determines the respective emotional states of the first vehicle operator and the second vehicle operator, the remote server 420 may transmit an indication of the respective emotional states to ED1 410 and ED2 420, respectively, via the network connection.

The signal diagram may continue when ED1 410 accesses (454) movement data of the first vehicle and ED2 420 accesses (456) movement data of the second vehicle. The movement data may consist of the location of the vehicle (e.g., GPS location), the direction vector or heading of the vehicle, velocity data, and/or other data associated with the operation or movement of the first and second vehicles. For example, the movement data of a vehicle may indicate that the vehicle is located on a roadway and traveling a particular direction on the roadway. After the movement data for the first vehicle and the second vehicle is accessed, ED1 410 may transmit (458) the emotional state of the first vehicle operator and the movement data of the first vehicle to the remote server 430 via the network connection, and ED2 420 may transmit (460) the emotional state of the second vehicle operator and the movement data of the second vehicle to the remote server 430 via the network connection.

After receiving the emotional state of the first vehicle operator and second vehicle operator and the movement data of the first vehicle and the second vehicle, the remote server 430 may generate a log of this information. The remote server 430 may also determine (462) whether at least one of the first vehicle operator and the second vehicle operator is frustrated (i.e., whether at least one of the respective emotional states is "frustrated" or a similar emotional state). If the remote server 430 determines that at least one of the first vehicle operator and the second vehicle operator is not frustrated ("NO"), the signal diagram 400 may returns to the beginning. In contrast, if the remote server 430 determines that at least one of the first vehicle operator and the second vehicle operator is frustrated ("YES"), the signal diagram 400 may proceed to 464. Although the determination of 462 is described as frustrated or frustration, it should be appreciated that the server 430 may additionally or alternatively consider other negative emotions, such as anger, disgust, sadness, irritated, and/or the like.

At 464, the remote server 430 may decide whether the first vehicle and the second vehicle are within a threshold distance from each other. In particular, the remote server 430 may determine whether a difference between the location of the first vehicle and the location of the second vehicle is below a threshold value (e.g., 100 feet). According to embodiments, the remote server 430 may also determine, based on the respective heading data of the vehicles, whether the first vehicle and second vehicle are traveling on the same roadway. For example, the first vehicle and the second vehicle may be traveling north in adjacent lanes on a highway. If the remote server 430 determines that the vehicles are within a threshold distance, and optionally that the vehicles are traveling together ("YES"), processing may proceed to 466. If the remote server 430 determines that the vehicles are not within a threshold distance ("NO"), processing may return to the beginning.

At 466, the remote server 430 may identify a third vehicle located at a third location behind the respective locations of the first and second vehicles. In particular, the remote server 430 may communicate, via a network connection, with ED3 440 associated with the third vehicle. In particular, the remote server 430 may retrieve movement data and destination information (e.g., a final destination of the third vehicle) from ED3 440 via the network connection. According to embodiments, the movement data may include a location, velocity, heading, and/or other data associated with operation or movement of the third vehicle.

Based on the respective movement data of the first vehicle, the second vehicle, and the third vehicle, the remote server 430 may determine (468) whether the third vehicle is located at least a threshold distance from the first and second vehicles. In embodiments, the threshold distance may be a default amount and/or may be configurable. For example, the threshold distance may be 500 feet. In embodiments, the remote server 430 may account for the direction of the third vehicle relative to the direction(s) of the first and second vehicles. For example, if all of the first, second, and third vehicles are traveling the same direction on a specific roadway, and the third vehicle is at least 500 feet from the first and second vehicles, then the remote server 430 may deem that the third vehicle is located at least a threshold distance from the first and second vehicles. If the remote server 430 determines that the third vehicle is not located at least a threshold distance from the first and second vehicles ("NO"), processing may return to 466, where the remote server 430 may identify another vehicle, or may return to the beginning. In contrast, if the remote server 430 determines that the third vehicle is located at least a threshold distance from the first and second vehicles ("YES"), processing may proceed to 470.

At 470, the remote server 430 may optionally retrieve (470) a set of preferences of the third vehicle operator from ED3 440 via the network connection. For example, the operator of the third vehicle may prefer to travel on familiar roadways or may prefer a route that has the fewest number of traffic lights. The remote server 430 may then generate (472), based on the location of the third vehicle and optionally the set of preferences, a set of alternate navigation directions for the third vehicle. According to embodiments, the alternate navigation directions may avoid the actual or predicted location(s) of the first and second vehicles. In generating the alternate navigation directions, the remote server 430 may account for the destination information that was previously retrieved from ED3 440. The remote server 430 may then determine a set of roadways from the third location to the destination location, where the set of roadways may exclude the first location and the second location. For example, the remote server 430 may determine a road(s) from the third location that is parallel to the road of the first location and the second location in order to circumvent and avoid the first and second location, similar to the scenario 200 described in FIG. 2. Additionally, the remote server 430 may determine the set of roadways based on at least one of: at least one location of at least on additional frustrated vehicle operator, a set of traffic conditions, a minimum distance to the final destination, and a minimum time to travel to the final destination.

After generating the set of alternate navigation directions, the remote server 430 may transmit (474) a notification to ED3 440 via the network connection. According to embodiments, the notification may indicate that the third vehicle is approaching a group or cluster of frustrated vehicle operators. Further, the notification may indicate an availability of the set of alternate navigation directions. ED3 440 may display (476) the notification for access and review by the operator of the third vehicle. In embodiments, the notification may contain a selection or link that, upon selection, may cause ED3 440 to access, retrieve, and/or present the set of alternate navigation directions. Accordingly, ED3 440 may receive (478) a selection to access the set of alternate navigation directions via a user interface of ED3 440. In response, the user interface of ED3 440 may display (480) the set of alternate navigation directions. The set of alternate navigation directions may include step-by-step directions to the final destination of the third vehicle, and may be in the form of a map (e.g., GPS navigation). In an implementation, ED3 440 may automatically display the set of alternate navigation directions via the user interface without the user selecting a link to access the set of alternate navigation directions.

Figure 5:
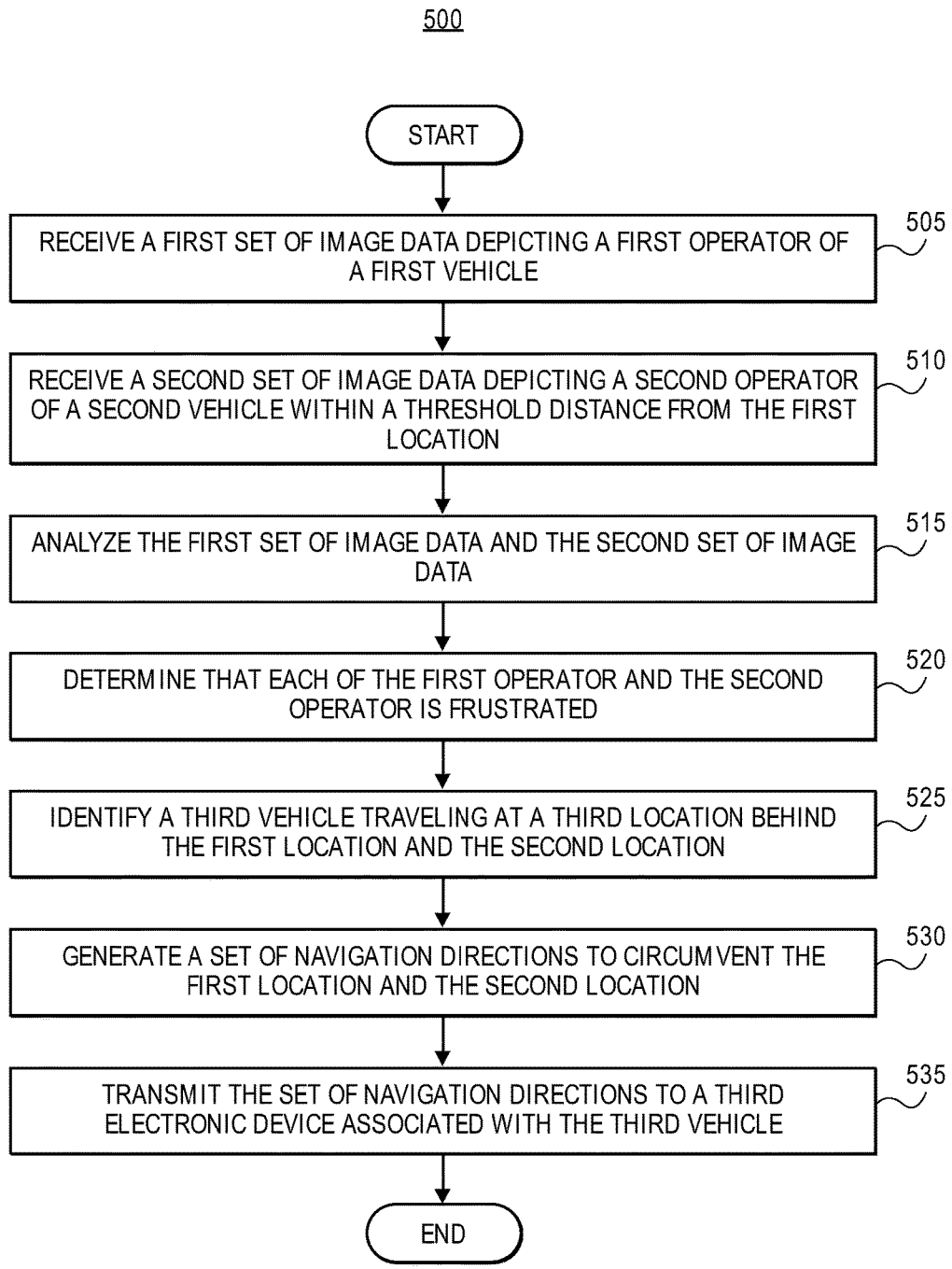
FIG. 5 depicts a flow diagram associated with generating alternate navigation directions for a vehicle, in accordance with some embodiments.

FIG. 5 depicts a block diagram of an exemplary method 500 of generating alternate navigation directions. The method 500 may be facilitated by a server that may be in communication with a set of electronic devices that may be located within a set of vehicles or incorporated as part of the set of vehicles. The server may support execution of a dedicated application that may facilitate the functionalities of the method 500. It should be appreciated that at least a portion of the functionalities of the method 500 may be performed by an electronic device associated with a vehicle.

The method 500 may begin when the server receives (block 505), from a first electronic device associated with a first vehicle located at a first location, a first set of image data depicting a first operator of the first vehicle. The server may also receive (block 510), from a second electronic device associated with a second vehicle located at a second location, a second set of image data depicting a second operator of the second vehicle. According to embodiments, the server may also receive respective location and movement data of the first vehicle and the second vehicle, and may determine, based on the respective location and movement data, that the second vehicle is located within a threshold distance of the first vehicle.

The server may analyze (block 515) the first set of image data and the second set of image data to determine or identify a set of characteristics that may be respectively exhibited by the first and second vehicle operators. In embodiments, the server may compare the first and second sets of image data to a set of baseline image data indicating a set of emotions and identifying characteristics indicative of one or more emotions. Based on the image analysis, the server may determine (block 520) that each of the first operator and the second operator is frustrated or otherwise exhibiting what may be considered a negative emotion.

After determining that the first and second operators are frustrated, the remote server may identify (block 525) a third vehicle located at a third location behind the first location and the second location. In particular, the server may passively receive or explicitly retrieve movement data and destination information from a third electronic device associated with the third vehicle. In embodiments, the server may analyze the movement data to determine that the third vehicle is at least a threshold distance from the first and second vehicles.

The remote server may generate (block 530), based on a location of the third vehicle and the destination information, a set of alternate navigation directions for the third vehicle to avoid the first location and the second location. In embodiments, a set of roadways included in the set of alternate navigation directions may exclude the location of the first vehicle and the location of the second vehicle and may optionally be based on a set of preferences retrieved from the third electronic device. The set of roadways included in the set of alternate navigation directions may also be based on at least one of: a set of traffic conditions, a minimum distance to the final destination, a minimum time to travel to the final destination, and at least one location of at least one additional frustrated vehicle operator.

After generating the set of navigation directions, the remote server may transmit (535) the set of navigation directions to the third electronic device. In embodiments, the third electronic device may display a notification to alert the operator of the third vehicle that there is a nearby group of frustrated vehicle operators, where the notification may also indicate the set of navigation directions. Further, the third vehicle operator may select to access the set of navigation directions, after which the third electronic may display the set of navigation directions.

Figure 6:
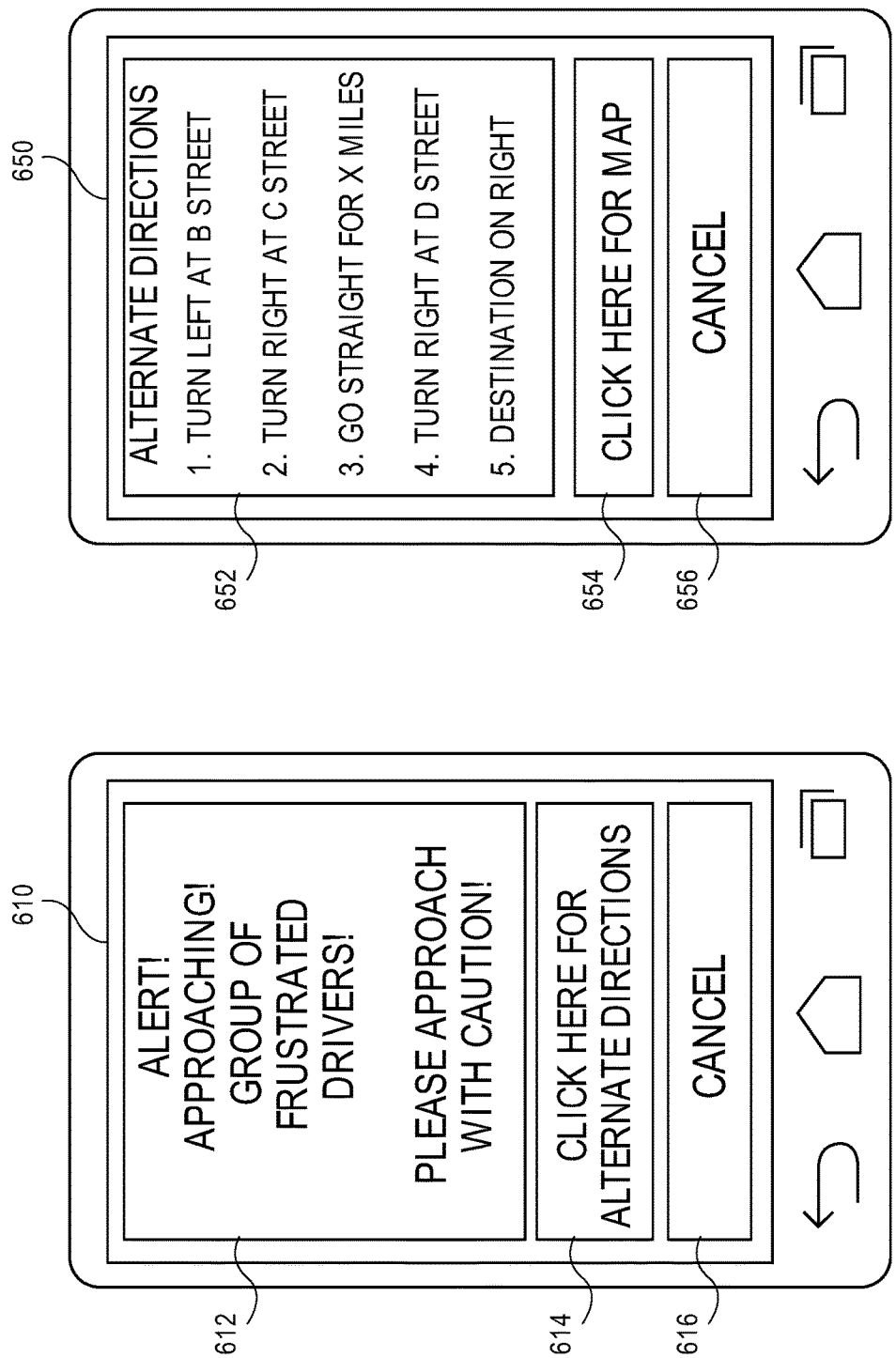
FIGS. 6A and 6B depict exemplary user interfaces associated with displaying alternate navigation directions, in accordance with some embodiments.

FIG. 6A illustrates an interface 610 associated with notifying a vehicle operator of a nearby group of vehicles with frustrated vehicle operators. The interface 610 may include an information box 612 that alerts the vehicle operator of the group of vehicle with frustrated vehicle operators. The interface 610 may include a "CLICK HERE FOR ALTERNATE DIRECTIONS" selection 614 that enables an accessing user (in some cases, the vehicle operator) to proceed to a subsequent interface that provides alternate navigation directions to the destination location of the accessing user. The interface 610 may also include a "CANCEL" selection 616 that enables an accessing user to select to dismiss the interface 610.

FIG. 6B illustrates an additional interface 650 associated with alternate navigation directions to avoid a group of vehicles with frustrated vehicle operators. In some embodiments, the electronic device may display the additional interface 650 in response to the user selecting the "CLICK HERE FOR ALTERNATE DIRECTIONS" selection 614 of FIG. 6A. The interface 650 may include an information box 652 that identifies the alternate navigation directions as a step-by-step list. The interface 650 may also include a "CLICK HERE FOR MAP" selection 654 that enables the accessing user to select to proceed to a subsequent interface that provides the alternate navigation directions to the destination location of the user in the form of a map (e.g., GPS navigation). Further, the interface 650 may also include a "CANCEL" selection 656 that enables an accessing user to select to dismiss the interface 650.

Figure 7:
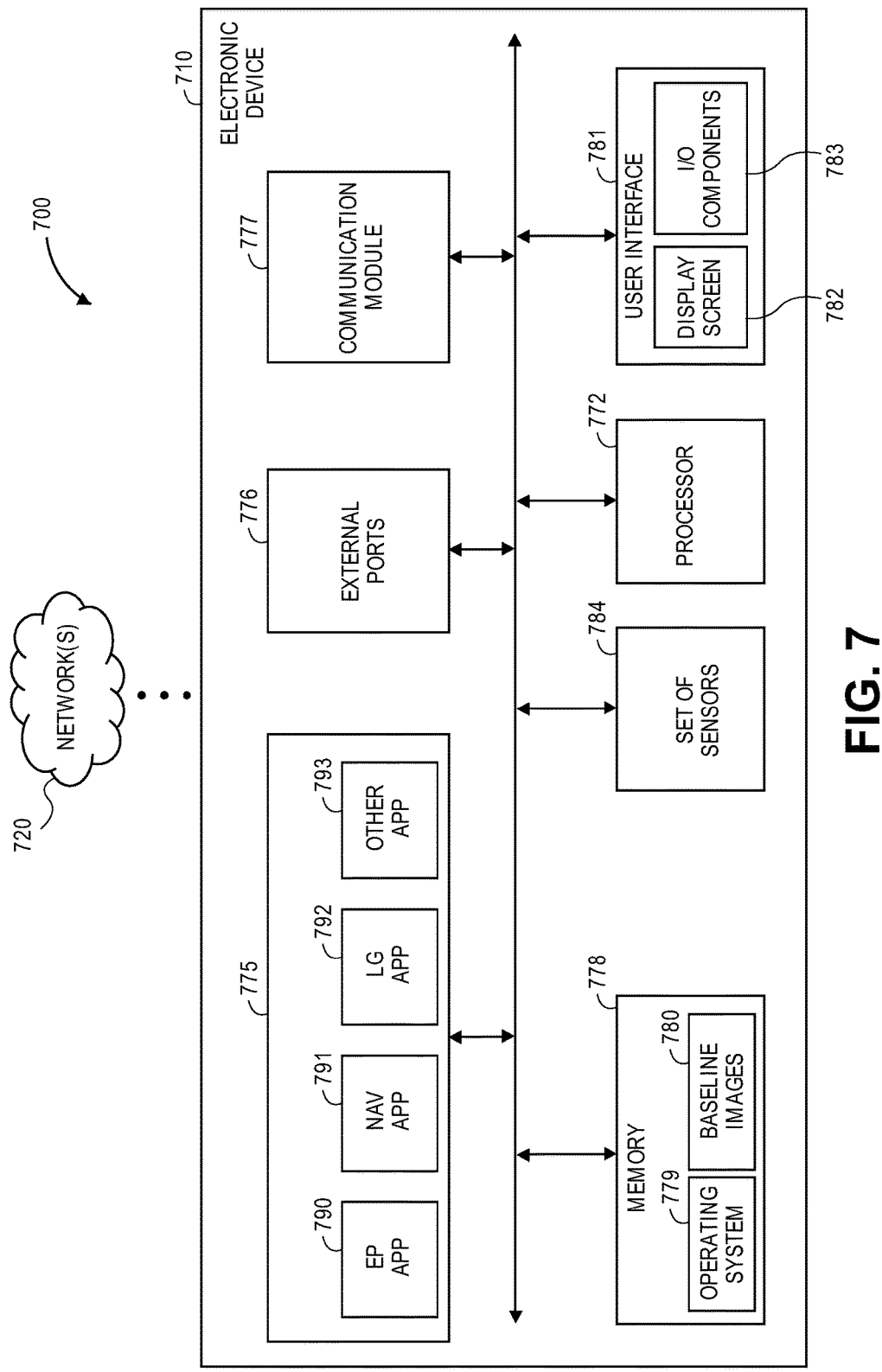
FIG. 7 is a block diagram of an exemplary electronic device, in accordance with some embodiments.

FIG. 7 illustrates a diagram of an exemplary mobile or other electronic device 710 (such as one of the electronic devices 110, 115 as discussed with respect to FIG. 1) in which the functionalities as discussed herein may be implemented. It should be appreciated that the electronic device 710 may be configured to be transported in a vehicle and/or connect to an on-board telematics platform of the vehicle, as discussed herein. Further, it should be appreciated that the electronic device 710 may be integrated into an on-board system of the vehicle. In some implementations, the electronic device 710 may be included as part of a remote server (such as the remote server 330 and 420 as discussed with respect to FIGS. 3 and 4 respectively).

The electronic device 710 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be an emotion processing application (EP APP) 790 configured to analyze image data to identify characteristics (e.g., movements, expressions, etc.) of an individual depicted in the image data in order to determine the emotional state of the vehicle occupant. Another example of one of the set of applications 775 may be a navigation application (NAV APP) 791 configured to generate navigation directions. One more example of one of the set of applications 775 may be a log generation application (LG APP) 792 configured to generate and record logs including various vehicle operation data. Each of the set of applications 775 may access each other in order to effectively perform its function. For example, the emotion processing application 790 may interface with the log generation application 792 to log a record of a determined emotional state of a vehicle operator. Additionally, the navigation application 791 may interface with the log generation application 792 to generate alternate navigation directions if the log indicates that there is a group of frustrated vehicle operators. It should be appreciated that one or more other applications 793 are envisioned.

The processor 772 may interface with the memory 778 to execute the operating system 779 and the set of applications 775. According to some embodiments, the memory 778 may also include a set of baseline images 780 of an individual in various emotional states such as happy, sad, frustrated, etc. In some implementations, the emotion processing application 790 may interface with the set of baseline images 780 in order to determine the emotional state of the vehicle operator. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 710 may further include a communication module 777 configured to communicate data via one or more networks 720. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. Further, the communication module 777 may include a short-range network component (e.g., an RFID reader) configured for short-range network communications. For example, the communication module 777 may receive, via the network 720, image data from a set of image sensors. For further example, the communication module 777 may transmit data to and receive data from a remote server via the network 720.

The electronic device 710 may further include a set of sensors 784. The processor 722 and the set of applications 775 may interface with the set of sensors 784 to retrieve and process corresponding sensor data. In one particular implementation, the emotion processing application 790 may use various data from the set of sensors to determine the emotional state of the vehicle occupant. Further, in an implementation, the electronic device 710 may interface with one or more image sensors that may be internal or external to the electronic device 710.

The electronic device 710 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs, speakers, microphones). According to some embodiments, the user may access the electronic device 710 via the user interface 781 to review information and/or perform other functions. In some embodiments, the electronic device 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 772 (e.g., working in connection with the operating system 779) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following texts set forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method in an electronic device for dynamically modifying a route, the method comprising:
   receiving, from a first electronic device associated with a first vehicle, first information indicating (i) a first location of the first vehicle, and (ii) a particular emotional state being experienced by a first operator of the first vehicle;
   receiving, from a second electronic device associated with a second vehicle, second information indicating (i) a second location of the second vehicle, and (ii) the particular emotional state being experienced by a second operator of the second vehicle;
   identifying a third vehicle located at a third location behind the first location and the second location;
   generating, based on the third location, an alternate route to avoid the first location and the second location; and
   transmitting, via a network connection, the alternate route to a third electronic device associated with the third vehicle.

2. The computer-implemented method of claim 1, wherein the first information comprises a first set of image data and the second information comprises a second set of image data, the method further comprising:
   comparing the first set of image data and the second set of image data to a set of baseline image data indicating a set of emotions;
   identifying, based on the comparing, characteristics indicative of one or more emotions from the first set of image data and the second set of image data; and
   determining, based on the characteristics indicative of the one or more emotions, a percentage likelihood that each of the first operator and the second operator is in the particular emotional state.

3. The computer-implemented method of claim 1, further comprising:
   generating a log including the first location and the second location.

4. The computer-implemented method of claim 1, wherein identifying the third vehicle located at the third location behind the first location and the second location comprises:
   calculating a distance between the third location and at least one of the first location and the second location; and
   determining that the distance is less than a predetermined threshold.

5. The computer-implemented method of claim 1, wherein identifying the third vehicle located at the third location behind the first location and the second location comprises:
   accessing (i) a first set of movement information associated with operation of the first vehicle, (ii) a second set of movement information associated with operation of the second vehicle, and (iii) a third set of movement information associated with operation of the third vehicle; and
   determining, based on the first set of movement information, the second set of movement information, and the third set of movement information, that the third vehicle is located at the third location behind the first location and the second location.

6. The computer-implemented method of claim 1, further comprising:
   transmitting, to the third electronic device via the network connection, a notification indicating that the third vehicle is approaching vehicle operators having the particular emotional state.

7. The computer-implemented method of claim 1, wherein generating, based on the third location, the alternate route to avoid the first location and the second location comprises:
   identifying a destination location associated with the third vehicle;
   determining a set of roadways from the third location to the destination location, the set of roadways excluding the first location and the second location; and
   generating the alternate route according to the set of roadways.

8. The computer-implemented method of claim 7, wherein determining the set of roadways from the third location to the destination location comprises:
   determining the set of roadways based on at least one of: at least one location of at least one additional vehicle operator, a set of traffic conditions, a minimum distance to the final destination, or a minimum time to travel to the final destination.

9. The computer-implemented method of claim 1, wherein generating, based on the third location, the alternate route to avoid the first location and the second location comprises:
   identifying a preferred alternate route to the final destination of the third vehicle; and
   generating the alternate route based on the preferred alternate route.

10. The computer-implemented method of claim 1, wherein transmitting the alternate route to the third electronic device associated with the third vehicle comprises:

transmitting, via the network connection, the alternate route to the third electronic device associated with the third vehicle, the alternate route causing the third electronic device to display, via a user interface, the alternate route.

11. A system for dynamically modifying a route comprising:

a memory configured to store non-transitory computer executable instructions; and a processor interfacing with the memory, wherein the processor is configured to execute the non-transitory computer executable instructions to cause the processor to:

receive, from a first electronic device associated with a first vehicle, first information indicating (i) a first location of the first vehicle, and (ii) a particular emotional state being experienced by a first operator of the first vehicle, receive, from a second electronic device associated with a second vehicle, second information indicating (i) a second location of the second vehicle, and (ii) the particular emotional state being experienced by a second operator of the second vehicle, identify a third vehicle located at a third location behind the first location and the second location, generate, based on the third location, an alternate route to avoid the first location and the second location, and transmit, via a network connection, the alternate route to a third electronic device associated with the third vehicle.

12. The system of claim 11, wherein the first information comprises a first set of image data and the second information comprises a second set of image data, and wherein the processor is further configured to:

compare the first set of image data and the second set of image data to a set of baseline image data indication a set of emotions;

identify, based on the comparing, characteristics indicative of one or more emotions from the first set of image data and the second set of image data; and determine, based on the characteristics indicative of the one or more emotions, a percentage likelihood that each of the first operator and the second operator is in the particular emotional state.

13. The system of claim 11, wherein the processor is further configured to:

generate a log including the first location and the second location.

14. The system of claim 11, wherein to identify the third vehicle located at the third location behind the first location and the second location, the processor is configured to:

calculate a distance between the third location and at least one of the first location and the second location, and determine that the distance is less than a predetermined threshold.

15. The system of claim 11, wherein to identify the third vehicle located at the third location behind the first location and the second location, the processor is configured to:

access (i) a first set of movement information associated with operation of the first vehicle, (ii) a second set of movement information associated with operation of the second vehicle, and (iii) a third set of movement information associated with operation of the third vehicle, and determine, based on the first set of movement information, the second set of movement information, and the third set of movement information, that the third vehicle is located at the third location behind the first location and the second location.

16. The system of claim 11, wherein the processor is further configured to:

transmit, to the third electronic device via the network connection, a notification indicating that the third vehicle is approaching vehicle operators having the particular emotional state.

17. The system of claim 11, wherein to generate, based on the third location, the alternate route to avoid the first location and the second location, the processor is configured to:

identify a destination location associated with the third vehicle, determine a set of roadways from the third location to the destination location, the set of roadways excluding the first location and the second location, and generate the alternate route according to the set of roadways.

18. The system of claim 17, wherein to determine the set of roadways from the third location to the destination location, the processor is configured to:

determine the set of roadways based on at least one of: at least one location of at least one additional vehicle operator, a set of traffic conditions, a minimum distance to the final destination, or a minimum time to travel to the final destination.

19. The system of claim 11, wherein to generate, based on the third location, the alternate route to avoid the first location and the second location, the processor is configured to:

identify a preferred alternate route to the final destination of the third vehicle, and generate the alternate route based on the preferred alternate route.

20. The system of claim 11, wherein to transmit the alternate route to the third electronic device associated with the third vehicle, the processor is configured to:

transmit, via the network connection, the alternate route to the third electronic device associated with the third vehicle, the alternate route causing the third electronic device to display, via a user interface, the alternate route.

* * * * *